United States Patent [19]
White

[11] Patent Number: 6,121,348
[45] Date of Patent: Sep. 19, 2000

[54] POWDERABLE REACTIVE RESIN COMPOSITIONS

[75] Inventor: Peter Drummond Boys White, Ross-on-Wye, United Kingdom

[73] Assignee: Ciba Specialty Chemicals Corp., Tarrytown, N.Y.

[21] Appl. No.: 09/077,048

[22] PCT Filed: Nov. 18, 1996

[86] PCT No.: PCT/GB96/02821

§ 371 Date: May 18, 1998

§ 102(e) Date: May 18, 1998

[87] PCT Pub. No.: WO97/19124

PCT Pub. Date: May 29, 1997

[30] Foreign Application Priority Data

Nov. 18, 1995 [GB] United Kingdom ................. 9523648
Nov. 18, 1995 [GB] United Kingdom ................. 9523650

[51] Int. Cl.⁷ .................................................. C08L 63/00
[52] U.S. Cl. .......................................... 523/400; 521/135
[58] Field of Search .............................. 521/135; 523/400

[56] References Cited

U.S. PATENT DOCUMENTS 5,708,120  1/1998  White ........................................ 528/87
5,908,901  6/1999  White ........................................ 525/438

FOREIGN PATENT DOCUMENTS 2164887  8/1973  France .
8600627  1/1986  WIPO .
9314136  7/1993  WIPO .
9521738  8/1995  WIPO .

OTHER PUBLICATIONS

Derwent Abstract No. 90–309077
Derwent Abstract No. 79–26941B

*Primary Examiner*—Edward J. Cain
*Attorney, Agent, or Firm*—David R. Crichton; Michele A. Kovaleski

[57] ABSTRACT

1. A reactive resin composition, which is a fusible, solid optionally foamable, heat curable, epoxy functional reaction prouct with a Kofler Heat Bank melting point of not less than 55° C., formed by mixing together (A) epoxy resins of epoxy group containing compounds (B) an amine solidifying system present in insufficient quantities to cause gelation after all the amino hydrogen atoms are consumed by epoxy groups, under the reaction conditions chosen for (A) and (B), and which yields a product with a Kofler Heat Bank melting point of greater than 55° C. and less than 120° C. and melting point stability of at least six months normal workshop temperatures, (C) a hardener system for (A) and the reaction product of (A) and (B) which is different from (B) and remains substantially unreacted under the conditions of reaction chosen for (A) and (B) with (A) and (B) and which is of low reactivity at normal workshop temperatures in the final solid epoxy formulation, optionally, (D) an expanding agent which is of low reactivity under the conditions of reaction chosen for (A) and (B) and which is of low reactivity at normal workshop temperatures in the final solid epoxy formulation, and optionally (E) other additives that may be required to modify the physical properties of the cured or uncured composition.

12 Claims, No Drawings

POWDERABLE REACTIVE RESIN COMPOSITIONS

This invention relates to heat curable, solid epoxy resin compositions which are especially suitable for use in powder form but are also useful in other configurations such as pellets, tablets, rods and sticks for example and in general have a Kofler Heat Bank melting point greater than 55° C. The compositions can also be foamable.

Solid, curable epoxy resin compositions are well known and find many useful commercial applications. These include for instance, protective and decorative coatings, electrical insulation, encapsulants, moulding compounds, adhesives and matrix resins for fibre reinforced composites.

Solid heat curable epoxy resin compositions are eventually used by a hot melt process whether it is by application in the already molten state or applied to an already heated surface and melts on contact or applied by techniques such as electrostatic spraying or placing in a mould and then melted and cured on heating.

For solid epoxy resin compositions to be useful in powder form they need to have a melting point as determined by the Kofler Heat Bank method of at least 55° C. and preferably 65° C. Powders with lower melting points rapidly sinter together when stored at normal workshop temperatures (15°–30° C.) and become unpourable. Low melting powders can be cold stored but this is expensive and gives rise to moisture condensation when exposed to normal workshop conditions making them less suitable for many applications.

Little attention has been given to these materials in the form of foamable powders although they can give significant advantages in terms of low density, low thermal conductivity, gap filling, accurate mould filling and lower costs, and some or all of these properties can be used to advantage in the end applications listed above.

Epoxy resin powders should find even more widespread use if they could be produced with a broader range of application and cured physical properties.

Desirable properties in such powders include a long usable life at normal workshop temperatures, a range of curing temperatures from 80° to 260° C. preferably from 90° C. to 220° C. within practical cure times, a wide band of melt viscosities and a variety of cured mechanical and thermal properties to suit particular uses. These desirable properties apply just the same for foamable powders which will normally be used by melting on contact with a heated surface or applied by techniques such as electrostatic spraying or placing in a mould or cavity and then melted and cured on heating.

The following list expands and helps to describe the properties which can be required from such epoxy powders.

(a) Powder Flow

The powder should flow and pour freely with no tendency to sinter or agglomerate over the whole period of its usable life at normal workshop temperatures. To achieve this property the powder should have a melting point of at least 55° C. and preferably 65° C. as determined by the Kofler Heat Bank method.

(b) Shelf Life

This should be at least three months at workshop temperatures and preferably in excess of 6 months. During this period the melting point should not increase to the point where the application properties or the cured product performance shows significant change.

(c) Homogeneity

It is very important that little or no separation of active ingredients occurs during storage or application as this can give rise to serious variation of properties in the final cured product.

(d) Application Melt Viscosity

Low melt viscosities are very valuable in obtaining smooth well adhered films when the powders are essentially used for coating purposes, whereas much higher viscosities may be needed for pressurised applications such as moulding powders or composite laminate manufacture.

(e) Curing Temperatures

There are a number of applications where temperatures as low as 100° C. or even lower, are desirable for curing, especially when in contact with heat sensitive materials such as some plastics, or when differential expansion stresses should be small. There are also many coating applications where very rapid flow and cure is needed to obtain speed of production and in these cases cure temperatures in the range of 180° C. to 260° C. are more useful.

(f) Curing Speed

All curing times must be economically short but a realistic range falls between 4 hours for powders capable of cure at the lowest end of the range, e.g. 80° C. and a few seconds for those designed for rapid production lines at 180° C. to 260° C.

(g) Temperature Resistance

Requirements will depend on the actual application and the other properties needed but powders capable of giving a glass transition temperature Tg, as high as 180° C. or more as measured by Differential Scanning Calorimetry are valuable in many areas.

(h) Other Properties

Many requirements need to be met to satisfy all applications, but important among those are toughness, flame and smoke suppression, chemical resistance and adhesion.

Hitherto, various methods have been proposed for the manufacture of epoxy powders and they fall principally within the following generalised techniques. However, none of these are capable of providing a range of powders which can meet the full spread of properties listed under (a) to (h) above.

(1) Hot Melt Mixing

This process is one of blending solid epoxy resins, hardeners and other additives as required above the melting point of the resins, then cooling, grinding and sieving to obtain the required particle size range. This is an effective and widely used technique but because the resin Kofler Heat Bank melting point should preferably be not less than 65° C. it is necessary for the mixing to be carried out in excess of 100° C. This method largely excludes hardeners that can be used for lower temperature curing. It also gives difficulties where very high melt viscosity systems are required due to the need to achieve sufficiently low viscosity for mixing.

(2) Blending of Powders

It has been proposed that solid powdered resins, solid powdered hardeners and other additives can be simply mixed together to give useful curable powders. GB Patents 1,147,370; 1,164,049; 1,361,909; 1,362,455; 1,371,967; 1,379,928; 1,446,870; 1,568,914. U.S. Pat. Nos. 4,113,684; 4,120,913. Even if carried out over long periods of time and in very fine particle size this normally leads to blends liable to serious separation on storage or application due to differences in particle size, shape or density.

To improve the homogeneity and reduce the separation potential of these blends it has been proposed that they are warm sintered and then reground and sieved. This is time consuming and expensive and may cause unwanted reaction to occur particularly as this technique is usually proposed for highly reactive systems.

Sintering and regrinding cannot totally prevent resin and hardener separation as it will always result in a heterogeneous composition unless the particles are extremely fine so approaching intimate mixing when potential unwanted reaction problems become even more likely. If the system is not of high reactivity then the Hot Melt Mixing method is more satisfactory.

The resins and hardeners used in Powder Blending may be themselves the solid reaction products of excess resin or hardener with corresponding hardener or resin.

(3) Production of B-Stage Compounds

The term B-stage is used to denote a stage of reaction between resins and hardeners which is intermediate between the A-stage, completely unreacted, and the C-stage gelled or cured, where all the reactable ingredients have reacted to the point where the mixture has become solid enough to significantly slow further reaction.

In this approach blends are made of resins and hardeners which all react together under the chosen conditions until the reaction products have the desired melting point, as exemplified by GB Patent 871,350; 1,019,925; 1,403,922; 1,529,588. U.S. Pat. No. 4,120,913. The reaction temperature may be room temperature or above. At this point most of the molecules present have partially reacted to form a mixture of various oligomers. At this extent of reaction further reaction becomes very slow at room temperature and may be slow enough to allow the product to be powdered and have some useful shelf life. As the powder is heated in its final application, so the reaction starts again, and as the hardeners are effectively bound into the high molecular weight reaction products the melt viscosity is always high and there is rarely sufficient time for such products to flow readily and usefully in the absence of external pressure before they reach the gelation point and stop flowing at all.

This approach has been studied extensively and often used in the production of moulding compounds. However, typical hardeners used in this way such as 4,4'-diaminodiphenyl methane. 1,3 diamino benzene and various tolylene diamines usually only give shelf lives of a few days to weeks at normal shop floor temperatures before gelation.

(4) Differential Reactivity Products

It has been suggested that useful powders can be made by employing two types of hardener for liquid epoxy resins (Japanese Patent 51037152) in which one hardener type is capable of curing efficiently at least 20° C. below the second hardener type. In the case of the lower temperature curing hardener type it is polyfunctional and it is proposed that 40% to 70% of the quantity normally used to fully cure the resin be used with the remaining unreacted epoxy groups being available for cure after flow by the second higher temperature curing hardener type. The disadvantage of this approach is that the use of such a high percentage of the lower temperature curing polyfunctional hardener which is necessary to obtain non-sintering powders is close to or above the amount capable of giving gelation and results in the solid composition gelling very rapidly on heating and hence of little value as a normal epoxy powder for coatings and does not form part of this invention. In the latter case the disadvantages are very much the same as in the case of B-staged materials as exemplified by very high viscosities and very short flow times.

These methods, for similar reasons, also restrict the range and type of acceptable foamable epoxy powders designed to cure in the range of 80° to 180° C. especially when they contain ingredients which are very sensitive to temperature and this make the Hot Melt technique particularly unsuitable.

Similar problems are encountered in the case of Powder Blending when the foaming agents are melt incorporated into the resin, the hardener, or both simultaneously. Where the foaming agents are simply blended into the system the resulting product is likely to suffer from inconsistencies due to separation on shipment, storage and shop floor use.

B-staging generally gives little time for good foaming to occur before rapid gelation.

Until now there has been no general method of producing heat curable epoxy functional powders with sufficient tolerance and flexibility to achieve the full range of desirable physical properties to satisfy the extremes of the application and cured product requirements. So it has been very important to find a method to make such powders which have a wide range of properties, excellent stability and can be manufactured reliably.

We have now discovered a surprisingly simple type of composition which permits the safe manufacture of heat curable, powderable, solid epoxy resin systems under extremely mild processing conditions and also allows all the physical requirements listed under (a), (b) and (c) above to be satisfied as well as the application and property extremes under (d), (e), (f), (g) and (h). This consists of making an epoxy formulation which is liquid at 120° C. or below, more usually at normal shop floor temperatures, and adding to it a chemical solidifying system which reacts very slowly at these temperatures with the epoxy materials present.

Accordingly, the present invention provides a one component heat curable epoxy functional powderable materials comprising:

(A) epoxy resin s or epoxy containing compounds, (B) a solidifying amine system which will react with (A) to give a product with a Kofler Heat Bank melting point of between 55° and 120° C., but which is not present in sufficient quantities to allow or cause chemical gelation under the reaction conditions chosen for (A) and (B) and which essentially stops solidifying before or when all its active epoxy additive hydrogen groups are consumed by the epoxy groups, (C) a hardener system for (A) and the reaction product of (A) and (B) which is different from (B) and which remains substantially unreacted under the conditions of reaction chosen for (A) and (B) with (A) and (B), and optionally, (D) an expanding agent which is of low reactivity under the condition of reaction chosen for (A) and (B) and which is of low reactivity at normal workshop temperatures in the final solid epoxy formulation and optionally, (E) Other additives that may be required to modify the physical properties of the cured or uncured composition.

The solidifying system must be picked to give very little reaction during the time it is in mixing with the epoxy resin and hardeners, by whatever method this is done, so that there is very little viscosity rise or temperature rise during the blending operation and hence making the filling of large or small simple or complicated containers a relatively easy task. Alternatively mixing may take place in the final container if required.

The solidifying reaction must be a simple amine addition reaction with the epoxy groups and must stop when the addition reaction stops. No tertiary amines may be present in the initial mixture or generated during the reaction which could significantly react under the conditions chosen for the solidification reaction. Such reactions severly compromise safety during bulk mixing, solidification once mixed and the softening point stability and shelf life of the resultant product. The solidifying system must be picked to satisfy these criteria.

This general composition also allows, either complete homogeneity of all the reactive ingredients or effective encapsulation of those not soluble in the original blend and also allows a wide range of viscosities and gel times to be designed into the product.

The solidifiable epoxy resin composition is made by blending (A), (B), (C), (D) and (E) together by any convenient batch or continuous operation but in such a way that at least (A) and (B) become homogeneous. The reaction between (A) and (B) may be carried out at any suitable temperature and condition provided that neither it, nor the enothermic heat generated from it causes (C) or (D) to substantially react whilst it is taking place.

By adopting the technique of this invention it becomes a relatively simple matter to produce optionally foamable powderable solid epoxy resin compositions which avoid the problems or difficulties or extreme conditions used with most current and other proposed methods for making powderable solid epoxy resin formulations.

It now becomes possible to avoid:
(i) The Hot Melt Mixing of solid epoxy resins with hardeners and other ingredients at relatively high temperatures. This invention allows the use of liquid resins or low temperature melting resins or blends.
(ii) The Blending of Powders together and the consequent chances of physical separation inhomogeneity and variable physical properties. This invention overcomes these disadvantages as it allows for liquid or soluble hardeners which will normally result in homogeneous compounds or alternatively for solid hardeners which can be finely ground and thoroughly dispersed in the resin or other components before final mixing, so that the resultant powder is effectively homogeneous and the fine hardener particles basically encapsulated in the solid resin.
(iii) The Production of B-stage Compounds of all types with their associated problems of high viscosity for processing and frequently very short shelf life. This invention specially sets out to avoid B-staging by creating the solid resin "in-situ" under mild conditions thus leaving the ultimate hardener effectively unreacted. This permits much greater case of wetting and flow of the molten powder before gelation when required.

It now becomes possible to obtain:
Powders with either low or high melt viscosities as required through the careful selection of (A) and (B).
Powders curing in 2 hours at 100° C. or less or a few seconds at 180° C. to 260° C. by the careful selection of (C).
A wide range of desired mechanical and thermal properties by the careful selection of (A), (B) and (C).
Ready modification of physical and mechanical properties may also be achieved by the introduction of additives. (E) including those heat sensitive in nature.
All of the above advantages and desired properties complemented by the long workshop temperature shelf life desirable for simple storage transportation and use.

The epoxy resins or epoxy group containing compounds (A) employed in this invention may be glycidyl ethers, glycidyl amines, glycidyl esters or cycloaliphatic compound or combinations of these including halogenated versions where required. Preferred epoxy resins and blends are those which are suitable liquids for ready mixing with the other ingredients at suitable temperatures which will usually be below 120° C. Epoxy resins or epoxy containing compounds or blends of them which are liquid at room temperatures are the most convenient.

The preferred solidifying systems (B) used to convert the liquid resins are principally compounds or mixtures of compounds whose most reactive groups relative to the epoxy materials employed are primary or secondary amines. Epoxy reactive tertiary amines under the conditions of reaction chosen for (A) and (B) are not acceptable for this invention.

Of particular usefulness in this process are aromatic and cycloaliphatic primary and secondary amines and blends of these. The major advantage of these amines, particularly the aromatic amines, is the low rate of reactivity coupled with the extremely long life at normal ambient temperatures of their reaction products with the resins. With the majority of compounds from these classes of amines the life of the reaction product with the resins greatly exceeds that of the life of the resins with their primary hardeners (C). Some alicyclic, heterocyclic and aliphatic amines are also effective as advancing agents and those which comply with cessation of reaction once their amino hydrogen atoms have been consumed by the epoxy resins and considered as part of this invention. In all cases it is essential that the tertiary amines generated during the solidification reaction have very low reactivity with epoxy groups under the conditions of reaction chosen for (A) and (B) and afterwards during storage. The solidifying amines are usually and mostly difunctional and/or polyfunctional with respect to the epoxy compounds (A) although monofunctional amines can be used to some extent if of value to a particular composition.

Difunctional maines may be used at any desired ratio with difunctional epoxy resins but greater than difunctional amines only to levels where gelation does not occur. The solidifying systems may contain a variety of other groups but these should only be of very low or no reactivity towards the epoxy groups involved under the reaction of (A) and (B).

Most useful are those solidifying systems which react gradually to substantial completion at room temperatures over a period of around 2–14 days. These permit the safe manufacture of batches in excess of 100 litres in a realistic mixing time with little temperature rise in the mixing vessel or during discharge and smooth reaction to the required physical state in most practical containers, however mixed over a practical timescale. Under these conditions the heat of reaction generated by the solidification process is evenly dissipated by conduction and radiation and results in no more than acceptable temperature rises at any stage in the process.

The primary controlling factor being that the mixture reaction temperature rise whether in the mixing vessel or the containers shall be below that required to cause significant reaction between (A), (C) or (D).

Should it be desirable to speed the solidification in the final container this can be achieved by heating provided the temperature used does not cause significant reaction of (C) with (A) or the reaction product of (A) and (B) either by direct heat or that evolved by completing the reaction between (A) and (B) or by the addition of accelerators such as carboxylic acids which do not adversely affect the softening point stability.

The solidifying systems must be present in such quantities that when their amino hydrogen atoms are all substantially reacted with the epoxy materials (A) under the conditions set for reaction (A) and (B) the product is not chemically gelled and has a melting point which is greater than 55° C. and lower than 120° C. and is essentially stable for greater than 6 months at 22° C. The resultant product is a brittle solid at 22° C. which could be cast into various physical forms such as sticks or pellets, but is essentially useful for grinding into powders.

The selection and quantity of the solidifying agent will also influence a variety of properties such as melt viscosity, strength, toughness and heat resistance and by careful choice advantages may be designed into the uncured or cured products resulting from the use of the process.

The hardener systems, (C) for the epoxy compounds (A) and the reaction products between (A) and (B) can be selected from the wide variety of those well known in the field of epoxy chemistry other than acid anhydrides which react preferentially with the advancing agents (B). Typical but not exclusive examples of useful hardeners are aromatic amines such as diaminodiphenyl sulphones, boron trifluoride amine complexes, latent imidazoles, carboxylic acids, biguanides, hydrazides, dicyandiamide, latent epoxy amine adducts and substituted ureas. As explained a main requirement of the hardener is that it should not substantially react whilst (A) and (B) are being reacted to form the epoxy composition which has a melting point greater than 55° C. There may be one or several hardeners used together, some of which may accelerate the curing rates of the other provided they comply with the requirement immediately above.

The expanding agents (D) may be of any type which does not adversely interfere with the production of the solid epoxy composition nor its ability to cure satisfactorily. The expansion obtained may result from chemical or physical reactions or both. An important feature is that the foaming agent should not cause substantial foaming during the process for the production of the solid epoxy compositions, nor on storage of it in any form at normal workshop temperatures or below. All significant expansion should take place during the actual curing cycles.

Examples of suitable expanding agents include

Azodicarbonamide, Azodiisobutyronitrile, Benzene sulphonhydrazide, Dinitroso pentamethylene tetramine, Oxybis benzene sulphonhydrazide, p toluene sulphonyl hydrazide and Expandable plastic such as those sold under the Trade Name Expancel.

These are largely spherical shells of varying composition such as polyvinylidene chloride and or polyacrylonitrile plus other copolymerised additives, and the inside contains isopentane±air.

Other additives, (E) which can be used to modify the physical properties of the cured or uncured compositions include but are not limited to thixotropes, toughening agents, wetting agents, surfactants, fibrous materials, dyes, pigments, fillers, flame retardants, smoke suppressants, coupling agents, hollow microspheres, flow assisting materials, fusible glasses and stabilisers.

The following Examples demonstrate some of the wide range of compositions which may be successfully used according to this invention.

EXAMPLE 1

A liquid Bisphenol A epoxy resin (EPIKOTE 828 - SHELL CHEMICAL CO.) with an epoxy content of approximately 5.3 gram equivalents of epoxy oxygen per kilogram was blended with amino benzene and dicyandiamide as follows:

| EPIKOTE 828 | 100 parts by weight |
| amino cyclohexane | 18 parts by weight |
| dicyandiamide | 4 parts by weight |

This mixture was thoroughly dispersed at 22° C. After five days the mixture was brittle and easily powdered and had a Kofler Heat Bank melting point of 65° C. 3 years later this melting point was 68° C. A portion was heated for two hours at 80° C. and on cooling the blend could easily be powdered and had a Kofler Heat Bank melting point of approximately 72° C. and remained unsintered for a least 3 years when stored at 22° C. On heating to 180° C. the powder melted to a free flowing liquid, then gelled and after 60 minutes was a strong, tough, thermoset, plastic compounds.

EXAMPLE 2

A crystalline Bisphenol F resin (PY 306 - Ciba-Geigy) with an epoxy content of approximately 6.2 gram equivalent of epoxy oxygen per kilogram was blended well with 4 aminotoluene and 4,4' diaminodiphenyl sulphone as follows:

| PY 306 | 100 parts by weight |
| 4aminotoluene | 26 parts by weight |
| 44' diaminodiphenyl sulphone | 10 parts by weight |

The 44' diaminodiphenyl sulphone was sieved through a B.S. 300 mesh sieve to obtain a fine powder free from lumps and this was dispersed thoroughly in 50 parts of liquid PY 306 at 22° C. obtained by warming the crystalline resin to 100° C. and allowing it to cool. The 4aminotoluene was warmed with the remaining 50 parts of liquid PY 306 at 55° C. until it melted and dissolved.

The two parts were then mixed together and allowed to stand at 22° C. for two days. They were then heated to 60° C. for five hours. The resulting solid was easily powdered and had a Kofler Heat Bank melting point of around 65° C. When cured for two hours at 180° C. it was a tough solid with a glass transition point of around 120° C. After six months at 22° C. the melting point had increased by only 5° C. and the powder was free flowing.

EXAMPLE 3

The following mixture was prepared:

| EPIKOTE 828 | 90.0 parts by weight |
| butane diol diglycidyl ether | 10.0 parts by weight |
| 4,4' diamino 3,3' dimethyl dicyclohexylmethane | 8.5 parts by weight |
| aminobenzene | 9.6 parts by weight |
| dicyandiamide | 4.0 parts by weight |

The finely powdered dicyandiamide was thoroughly mixed into the low viscosity blend of the other ingredients and the dispersion was placed inside a polythene bag. After 4 days at 22° C. it was a brittle solid. The solid was then heated for 3 hours at 70° C. It was powdered and had a Kofler Heat Bank melting point of around 65° C. Three months later it still poured readily. On heating for 1 hour at 180° C. the mixture first melted, then flowed readily, gelled and became a tough solid.

A further mixture of this composition was prepared and left for 7 days at 22° C. After this time it was a brittle solid with a Kofler Heat Bank melting point of 61° C. Six months later it poured readily and the melting point had increased by 4° C.

EXAMPLE 4

The following mixture was prepared:

| | |
|---|---|
| DER 332 | 100.0 parts by weight |
| 4,4' diamino 3,3' dimethyl dicyclohexyl methane | 5.8 parts by weight |
| aminobenzene | 9.3 parts by weight |
| 4,4' diaminodiphenyl sulphone | 16.4 parts by weight |

DER 332 is a nearly pure Bisphenol A diglycidyl ether solid by DOW Chemical Co. The DER 332 was warmed to 50° C. to melt it and after cooling was mixed with the 4,4' diaminodiphenyl sulphone powder. This blend was run through a triple roll mill to obtain a good dispersion. The remaining amines were added and the resultant blend was covered with a polythene film and allowed to solidify at 22° C. for 4 days. The mixture was then heated for two hours at 60° C. and cooled. It was a brittle solid with a Kofler Heat Bank melting point of around 70° C. It was powdered and six months later had increased in melting point by approximately 2° C.

The powder was heated in a released container for 2 hours at 100° C. 4 hours at 150° C. and then post cured for 4 hours at 200° C. The resultant polymer possessed a TG of 182° C. as measured by the D.S.C. method.

EXAMPLE 5

The following mixture was prepared:

| | |
|---|---|
| DEN 438 | 20 parts by weight |
| DER 331 | 80 parts by weight |
| aminobenzene | 20 parts by weight |
| Anchor 1040 | 3 parts by weight |

DEN 438 is a semi solid epoxy novolak resin sold by DOW Chemical Co with an epoxy content of about 5.6 gram equivalents of epoxy oxygen per kilogram.

DER 331 is a liquid Bisphenol A epoxy resin sold by DOW Chemical Co with an epoxy content of about 5.2 gram equivalents of epoxy oxygen per kilogram.

Anchor 1040 is a coordination complex of boron trifluoride marketed by ANCHOR Chemical Co.

The two resins were warmed and mixed together and allowed to cool to 22° C. The remaining ingredients were added with stirring to give an homogeneous blend. After three days the mixture was heated at 55° C. On cooling it was a brittle solid which was easily powdered. It had a Kofler Heat Bank melting point of around 65° C. On heating to 180° C. for 60 minutes it melted, gelled and cured to give a hard thermoset plastic.

After six months the powder flowed readily and melted at around 70° C.

EXAMPLE 6

The following mixture was prepared:

| | |
|---|---|
| EPIKOTE 828 | 100.0 parts by weight |
| 4,4' diamino diphenyl methane | 8.8 parts by weight |
| aminobenzene | 6.1 parts by weight |
| dicyandiamide | 3.5 parts by weight |
| 3(4 chorophenyl) 1.1 dimethyl urea | 2.7 parts by weight |
| fumed silica | 3.5 parts by weight |
| carbon black | 1.0 parts by weight |

The carbon black, dicyandiamide and substituted urea were mixed with 50 parts of the liquid resin and triple roll milled to obtain a good dispersion. This was then blended with a solution of the 4,4' diamino diphenyl methane in the remaining resin and the other ingredients. The whole mixture was placed in a container and after 7 days at 22° C. the blend was a brittle solid. It was heated for 2 hours at 60° C. then cooled and powdered. It had a melting point of around 60° C. This powder remained free flowing for at least 6 months at 22° C. and showed no increase in melting point. The powder was applied to clean steel rods, heated to 180° C. by fluidised bed techniques and gave a smooth black coating which adhered well and was very tough after a cure of 180 minutes at 100° C.

EXAMPLE 7

The misture in Example 1 was poured into a tray and heated for 5 hours at 80° C. On cooling it was a brittle, powderable solid with a melting point of 80° C. After 9 months at 22° C. this powder flowed freely and retained the same melting point. On heating to 180° C. for 1 hour it cured to form a tough, thermoset product.

EXAMPLE 8

A liquid Bisphenol A epoxy resin (EPIKOTE 828 - SHELL CHEMICAL CO.) with an epoxy content of approximately 5.3 gram equivalents of epoxy oxygen per kilogram was blended with aminobenzene. 44' diamino diphenyl sulphone, 44' oxybis benzene sulphonylhydrazide and a fumed silica.

All the powders were passed through a B.S. 300 mesh sieve to remove any agglomerates and were then thoroughly dispersed by passing a triple roll mill with 50 parts of the liquid resin.

The composition employed was:

| | |
|---|---|
| EPIKOTE 828 | 100.0 parts by weight |
| aminobenzene | 19.7 parts by weight |
| 44' diamino diphenyl sulphone | 6.6 parts by weight |
| 44' oxybis benzene sulphonylhydrazide | 1.0 parts by weight |
| fumed silica | 2.0 parts by weight |

All the components were mixed together and placed in a released tray. After five days the solid blend was heated for two hours at 60° C. On cooling to 22° C. the blend could easily be powdered. The powder had a Kofler Heat Bank melting point of approximately 70° C. After storing at ambient temperature for six months the softening point was approximately 73° C. and no sintering had occured. On heating to 180° C. the powder melted, rapidly increased in viscosity, foamed and cured. After 60 minutes a strong tough, thermoset foam was obtained.

EXAMPLE 9

The following mixture was produced:

| | |
|---|---|
| EPIKOTE 828 | 100.0 parts by weight |
| 44' diamino 33' dimethyl dicyclohexyl methane | 10.6 parts by weight |
| benzylamine | 7.1 parts by weight |
| azodiisobutyronitrile | 3.0 parts by weight |
| dicyandiamide | 3.5 parts by weight |
| 3(4chlorophenyl) 1,1 dimethylurea | 2.9 parts by weight |
| fumed silica | 8.0 parts by weight |

All the solids with the exception of the fumed silica were sieved and milled with 10 parts of liquid resin as per EXAMPLE 8. The fumed silica was added as the last ingredient to the mixture, which then became very thixotropic. The mixture was placed in a tray and was covered with a polythene film. After five days the mixture was a brittle solid. On powdering the Kofler Heat Bank melting temperature was 65° C. When tested after storage at normal ambient temperature for 850 days the softening temperature had increased by 13° C. to 80° C. and the powder flowed freely with no sign of sintering.

After initial powdering the coarser and finer particle fractions were removed leaving a particle size range between 250 and 2500 microns. The powder was placed into a tube of 0.65 centimetre diameter, closed at one end to the point where the tube was full of powder. The filled tube was then put into an oven and heated for 1 hour at 120° C. At the end of this time the tube was filled with a strong cured foam which was still of approximately the same volume as the tube. On careful examination of the physical curing process it became clear that the composition particles melted but did not flow and then expanded to fill the voids between them to give the final foam filled tube. The density of this foam was 0.6 grams per cubic centimetre. It will be apparent to workers in this field that the powder of this example could be used as a lower density gap filling adhesive if the tube was clean and receptive to bonding or as a low density moulding or casting material if the tube was release treated to prevent adhesion.

EXAMPLE 10

The following mixture was produced:

| | |
|---|---|
| EPIKOTE 828 | 100.0 parts by weight |
| 44' diamino 33' dimethyl dicyclohexyl methane | 10.0 parts by weight |
| aminocyclohexane | 6.6 parts by weight |
| phenolic microbaloons | 10.0 parts by weight |
| Expancel 550 DU | 3.0 parts by weight |
| dicyandiamide | 3.5 parts by weight |
| 3(4chlorophenyl) 1,1 dimethylurea | 2.9 parts by weight |
| fumed silica | 2.0 parts by weight |

Expancel 550 DU is a type of very small diameter expandable plastic bead. Phenolic microballoons are very low density hollow phenolic spheres. The mixture was thoroughly blended with the Expancel being added as the last ingredient and then placed in a tray. It was covered with a film of polythene and stored at 25° C. for 4 days. After this period it was powdered and possessed a Kofler Heat Bank melting point of approximately 65° C. After 700 days storage at normal ambient temperature the melting point had increased to 80° C. and no sintering had occurred.

A similar experiment with a tube filled with the powder was carried out as an in Example 9. In this case the powder melted and flowed somewhat during the heating cycle, but then expanded and overfilled the tube when fully cured after 60 minutes at 120° C. The initial powder had a volume filling density of 0.4 grams per cubic centimetre and the well structured cured foam a density of 0.3 grams per cubic centimetre.

EXAMPLE 11

The following mixture was produced:

| | |
|---|---|
| diglycidylether of Bisphenol-F | 50.0 parts by weight |
| diglycidylether of tetrabromobisphenol-A | 50.0 parts by weight |
| aminobenzene | 5.4 parts by weight |
| 44' diamino diphenyl methane | 7.7 parts by weight |
| Anchor 1040 | 3.0 parts by weight |
| 44' oxybis benzene sulphonylhydrazide | 1.0 parts by weight |
| fumed silica | 6.4 parts by weight |

Anchor 1040 is a coordination complex of boron trifluoride marketed by ANCHOR Chemical Co.

The Bisphenol-F and tetrabromobisphenol-A resins were melted together at 100° C., and when mixed, the 44' diamino diphenyl methane was added with rapid stirring until dissolved and the whole blend then quickly cooled to 22° C. The remaining liquids and solids were added with thorough stirring and the mixture was placed in a released tray. After five days the blend was heated to 40° C. for four hours and was then broken and powdered. It possessed a Kofler Heat Bank softening temperature of around 60° C. After six months the softening point increased to 74° C. On heating to 180° C. the powder coalesced and foamed and yielded a strong thermoset product after curing for two hours at 180° C.

EXAMPLE 12

A composition identical to Example 9 was prepared, other then the fumed silica level was reduced to 4.5 parts per hundred parts of resin by weight. This product was powdered and sieved to a particle size range between 200 and 800 microns.

This product was applied to clean steel rods, heated to 120° C. by the fluidised bed technique. The powder melted and adhered to the rods and after curing for 30 minutes at 120° C. gave a smooth, strong foamed coating. A similar experiment carried out with the rods heated to 200° C. gave a coating which was foamed and adhered without any extra curing.

As may be seen from the foregoing examples, this chemical approach to the production of curable optionally foamable epoxy powders employs conditions much less rigorous than the method of Hot Melt Mixing solid resins with hardeners, which require mix temperatures of around 100° C. or frequently above.

With the current invention, in many cases, the epoxy resin blends are liquid at 22° C. and the solidifying reaction takes place at the same temperature.

If further heating is required to obtain a stable pourable powder at 22° C. or thereabouts it rarely needs to be above 50°–60° C.

The simplicity and mildness of the approach to making these epoxy powders enables the incorporation of a wider variety of heat sensitive additives including hardeners and accelerators than is possible with the Hot Melt method and yields powders with outstandingly long shop floor temperature storage times.

The use of temperatures above 60° C. to obtain suitable solids and powders is only necessary to increase speed or throughput in production.

It will be clear from the examples that most of the compositions of matter disclosed here could be cast into specific shapes rather then ground into powder if required, or that the powders could be melted or sintered into specific shapes as well. It will also be clear that the cured products could find use as adhesives, encapsulants, insulating materials and mouldings as well.

What is claimed is:

1. A reactive resin composition, which is a fusible, solid optionally foamable, heat curable, epoxy functional reaction prouct with a Kofler Heat Bank melting point of not less than 55° C., formed by mixing together
   (A) epoxy resins of epoxy group containing compounds
   (B) an amine solidifying system present in insufficient quantities to cause gelation after all the amino hydrogen atoms are consumed by epoxy groups, under the reaction conditions chosen for (A) and (B), and which yields a product with a Kofler Heat Bank melting point of greater than 55° C. and less than 120° C. and melting point stability of at least six months normal workshop temperatures,
   (C) a hardener system for (A) and the reaction product of (A) and (B) which is different from (B) and remains substantially unreacted under the conditions of reaction chosen for (A) and (B) with (A) and (B) and which is of low reactivity at normal workshop temperatures in the final solid epoxy formulation, and optionally,
   (D) an expanding agent which is of low reactivity under the conditions of reaction chosen for (A) and (B) and which is of low reactivity at normal workshop temperatures in the final solid epoxy formulation, and optionally
   (E) other additives that may be required to modify the physical properties of the cured or uncured composition.

2. A composition according to claim 1 where the mixture is heated to speed the solidification reaction between (A) and (B) without significantly activating hardener (C) or expanding agent (D).

3. A composition according to claim 1 where the partially solidified composition may be heated to speed completion provided the temperature reached due to the completion of the solidification reaction does not significantly activate hardener (C) or expanding agent (D).

4. A composition according to claim 1 which, when ground is a free flowing powder at normal workshop temperatures.

5. A composition according to claim 1 which cures with the range of 80° C. to 260° C.

6. A composition according to claim 1 where the majority of the epoxy groups are present as glycidyl ether, glycidyl amine, glycidyl ester, cycloaliphatic and other epoxy resins.

7. A composition according to claim 1 where the epoxy group containing compounds (A) are free flowing liquids at 120° C. or less.

8. A composition according to claim 1 where the solidifying agents are mainly aromatic cycloaliphatic or alicyclic primary amines, secondary amines or mixtures of the two together with any acid accelerator.

9. A composition according to claim 8 where the majority of the solidifying amine groups are difunctional or difunctional and poly difunctional with respect to the epoxy groups.

10. A composition according to claim 1 where suitable hardener systems include aromatic amines such as 44' diaminodiphenyl sulphone, boron trifluoride amine complexes, latent imidazoles, carboxylic acids, biguanides, hydrazides, dicyandiamide, latent epoxy amine adducts and substituted ureas.

11. A composition according to claim 1 where expanding agents are present and include those generating gases by chemical decomposition or by boiling of liquids or expansion of gases contained within expandable shells.

12. Cured products obtained by heating a composition according to claim 1.

* * * * *